(12) United States Patent
Robinson

(10) Patent No.: US 9,159,010 B2
(45) Date of Patent: Oct. 13, 2015

(54) CODED INFORMATION SYSTEMS

(75) Inventor: Duncan Robinson, Sileby (GB)

(73) Assignee: RNIB, Inc., London (GB)

( * ) Notice: Subject to any disclaimer, the term of this patent is extended or adjusted under 35 U.S.C. 154(b) by 0 days.

(21) Appl. No.: 13/702,503

(22) PCT Filed: Jun. 10, 2011

(86) PCT No.: PCT/GB2011/000880
§ 371 (c)(1),
(2), (4) Date: Feb. 20, 2013

(87) PCT Pub. No.: WO2011/154709
PCT Pub. Date: Dec. 15, 2011

(65) Prior Publication Data
US 2013/0153670 A1    Jun. 20, 2013

(30) Foreign Application Priority Data

Jun. 11, 2010 (GB) .................................. 1009774.9
Feb. 17, 2011 (GB) .................................. 1102780.2

(51) Int. Cl.
*G06K 19/06* (2006.01)

(52) U.S. Cl.
CPC .... *G06K 19/06037* (2013.01); *G06K 19/06046* (2013.01)

(58) Field of Classification Search
CPC .......... G06K 7/1417; G06K 19/06037; G06K 19/06046; G06F 3/0317
USPC ................................................ 235/487, 494
See application file for complete search history.

(56) References Cited

U.S. PATENT DOCUMENTS

| | | | | |
|---|---|---|---|---|
| 5,825,947 A * | 10/1998 | Sasaki et al. | .......... | 382/321 |
| 6,681,055 B1 * | 1/2004 | Sato | .......... | 382/275 |
| 8,459,565 B2 * | 6/2013 | Wang et al. | .......... | 235/494 |
| 8,488,204 B2 * | 7/2013 | Wei et al. | .......... | 358/3.28 |
| 2003/0117652 A1 * | 6/2003 | Lapstun | .......... | 358/1.18 |
| 2003/0133164 A1 * | 7/2003 | Tsai | .......... | 358/3.28 |
| 2004/0262407 A1 * | 12/2004 | Lapstun | .......... | 235/494 |
| 2006/0023956 A1 * | 2/2006 | Hugosson et al. | .......... | 382/232 |

(Continued)

FOREIGN PATENT DOCUMENTS

| | | |
|---|---|---|
| EP | 1833001 A1 | 9/2007 |
| GB | 2384094 A | 7/2003 |

(Continued)

OTHER PUBLICATIONS

International Search Report for PCT Application No. PCT/GB2011/000880, dated Dec. 13, 2011.

*Primary Examiner* — Paultep Savusdiphol
(74) *Attorney, Agent, or Firm* — Patterson & Sheridan, LLP

(57) ABSTRACT

A code is applied to a part of the retail item or its packaging/label. The code is applied in a repeat pattern. The code is presented in an optical machine-readable format. Code markers are arranged at pre-defined positions within a matrix. An optical machine-readable orientation device indicates the correct orientation of the matrix, so that the position of the code markers within the correctly orientated matrix corresponds to a pre-defined sequence of code integers. The code corresponds to an existing barcode number for the retail item. The code is presented in a manner discreet enough to be part of the printed design of a label or packaging for the retail item, without changing the overall appearance of the printed design.

19 Claims, 6 Drawing Sheets

(56) References Cited

U.S. PATENT DOCUMENTS

| | | | |
|---|---|---|---|
| 2007/0023523 A1* | 2/2007 | Onishi | 235/454 |
| 2007/0045427 A1* | 3/2007 | Onishi | 235/494 |
| 2007/0206029 A1 | 9/2007 | Wei et al. | |
| 2007/0272735 A1* | 11/2007 | Silverbrook et al. | 235/375 |
| 2009/0017271 A1 | 1/2009 | Meiring et al. | |
| 2009/0224054 A1* | 9/2009 | Wei et al. | 235/470 |
| 2009/0294544 A1* | 12/2009 | Walmsley et al. | 235/494 |
| 2009/0302114 A1* | 12/2009 | Ao et al. | 235/454 |
| 2009/0323124 A1* | 12/2009 | Wei et al. | 358/3.28 |
| 2010/0128997 A1* | 5/2010 | Chang et al. | 382/241 |
| 2011/0049244 A1* | 3/2011 | Wang et al. | 235/470 |

FOREIGN PATENT DOCUMENTS

| | | |
|---|---|---|
| JP | 2000148922 A | 5/2000 |
| JP | 2007288756 A | 11/2007 |
| WO | 2006112866 A2 | 10/2006 |

* cited by examiner

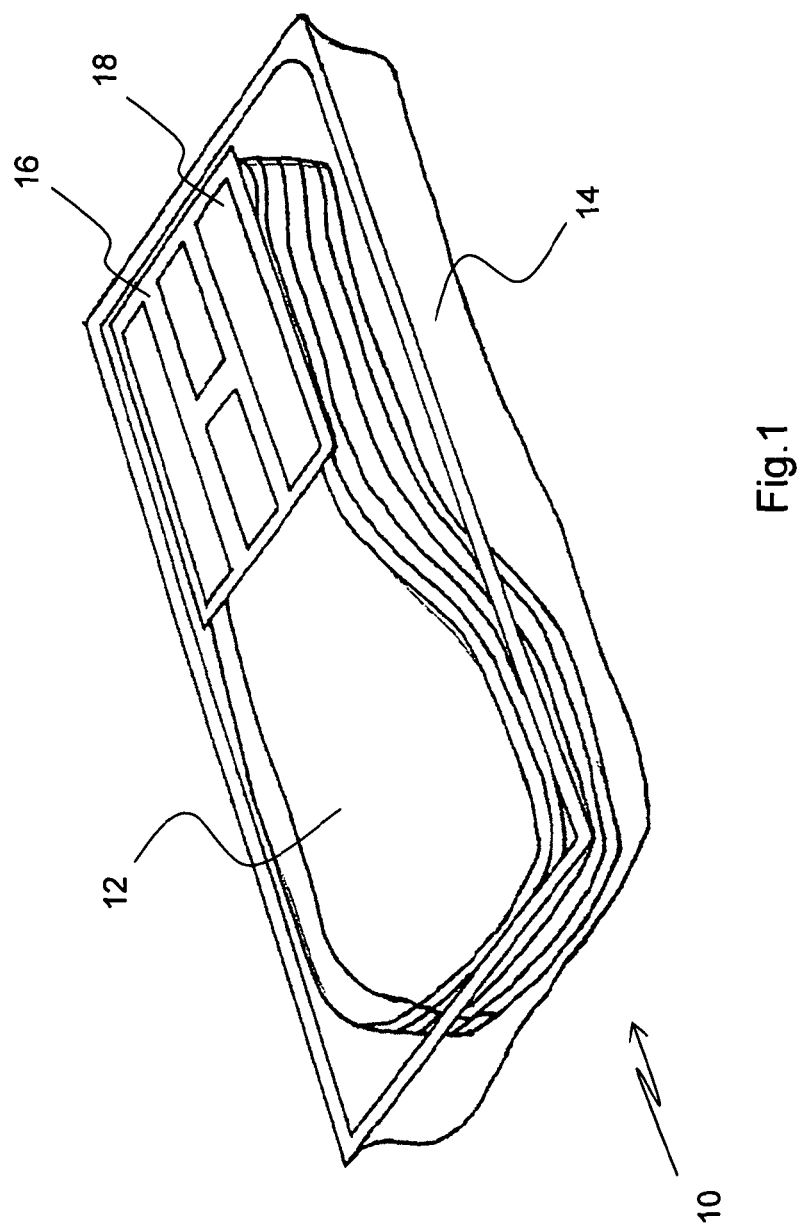

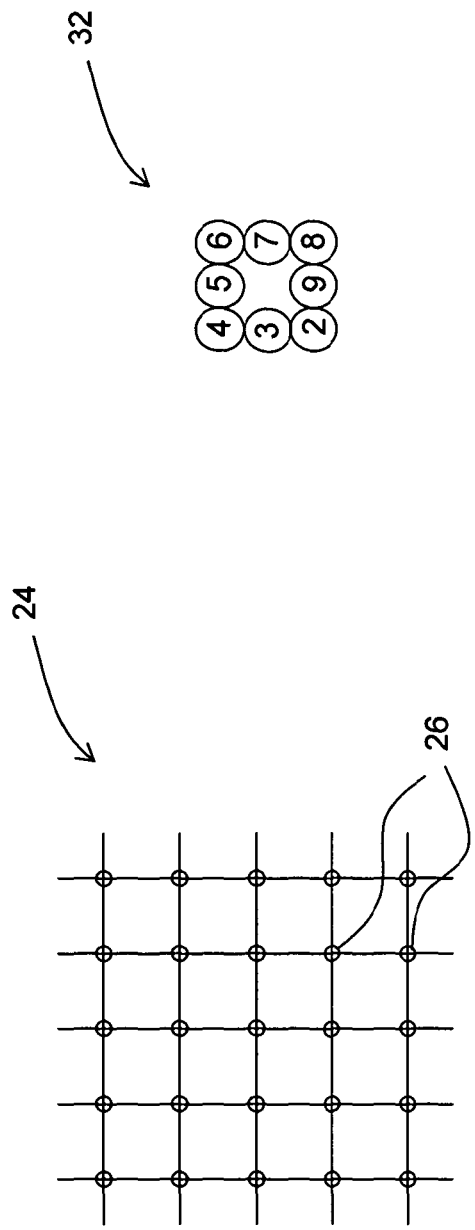

CODED INFORMATION SYSTEMS

The present invention relates to coded information systems. More particularly, but not exclusively, the present invention relates a machine-readable code format for conveying data. The present invention also relates to documents, packaging and retail items incorporating information presented in a machine-readable code format.

A barcode is a well-established machine-readable representation of coded information. Barcodes are typically used on consumer goods, and can be read by an optical scanner, e.g. at a retail check out. However, conventional barcodes present a difficulty to blind or partially sighted users, particularly when scanning with a hand held device.

The invention overcomes or mitigates the limitation of conventional bar code systems referred to above and/or other problems with known machine-readable coded information systems.

According to one aspect of the invention, there is provided an optical machine-readable code format having an optical machine-readable code zone and a plurality of optical machine-readable code markers arranged within the code zone, wherein each of the code markers is arranged at one of a plurality of pre-defined positions within the code zone, wherein the code format includes an optical machine-readable orientation device indicating a correct orientation of the code zone, and wherein the position of the code markers within a correctly orientated code zone corresponds to a pre-defined code.

The orientation marker ensures that the code format is read in the correct way, e.g. with the code integers in the correct sequence, irrespective of the orientation of the product when scanning with an optical device.

Advantageously, the pre-defined code may correspond to an existing barcode number, for applying to retail items (e.g. directly onto a retail item, or on a label or part of the packaging for a retail item). This enables the code format to be used as an alternative to conventional barcodes.

In exemplary embodiments, the code format is arranged in a repeat pattern. This is of particular use for blind or partially sighted users, wherein the repeat pattern improves the chance of a blind or partially sighted user positioning the device adjacent the code format. It will be understood that the presentation of the code format as a repeat pattern is contrary to conventional barcode techniques.

In exemplary embodiments, the code format is presented in a manner discreet enough to be part of the printed design of a label or packaging for a product, without changing the overall appearance of the printed design.

The code format may be applied as part of the reprographic process and incorporated into the printed design. In such embodiments, the code can be applied in a manner to take up no extra or added space on the label area, e.g. as can be achieved using Braille. This is wholly contrary to conventional bar codes, which take up a dedicated area of the label or packaging. Hence, such embodiments can be used to replace conventional barcodes, leaving more space for product information or advertising on the label or packaging.

The code zone may have any suitable shape, e.g. of triangular, square, rectangular, cruciform or circular area.

The code zone may be repeated over a portion of the product or packaging, e.g. in a repeat pattern of identical code zones, e.g. one adjacent another, over a specific portion of the product or packaging (which may correspond to an area of printed information on the product or its packaging). Such configurations would be ideally suited for reading using a pen-type optical reading device.

In exemplary embodiments, the area of the code zone will be less than 10 $mm^2$.

In exemplary embodiments, the area of the code zone will be greater than 1 $mm^2$.

In exemplary embodiments, the code zone consists of a matrix of points, e.g. in a pre-defined array, with individual points in the matrix representing individual parts of the code, e.g. with each point representing an individual integer of the code. Hence, the code markers may be positioned at a plurality of said points in the matrix, in order to define an optical machine readable sequence of code integers.

In these embodiments, a code marker may be positioned at one of a plurality of pre-defined locations associated with one of said points in the matrix, e.g. wherein each pre-defined location represents a specific code integer associated with the respective point in the matrix.

The orientation device may comprise a pattern of marked points in the code zone matrix.

In exemplary embodiments, the code zone forms part of a matrix of points, e.g. in a pre-defined array, wherein a plurality of points in the matrix defines the code zone and other points in the matrix define the orientation device.

The code format may take the form of an array of dots or other markers (such as crosses or other symbols/shapes) provided in a pattern on a matrix consisting of a plurality of pre-defined points, wherein the pre-defined points in the matrix represent parts or integers of the code, so that the pattern of markers on the matrix defines an optical machine-readable sequence of code parts or integers.

The pattern of markers on the matrix may include a plurality of fixed markers and a plurality of variable markers, wherein said fixed markers define the orientation device (so that a scanner or imaging device configured for reading the format can determine the correct orientation of the matrix), and wherein the variable markers define the code.

In exemplary embodiments, the variable markers are positionable at one of a plurality of pre-defined locations associated with a respective one of said pre-defined points in the matrix, each pre-defined location representing a code integer for the respective point in the matrix. Each plurality of pre-defined locations may represent a sub matrix of points within said matrix.

In one example, each point in the matrix is defined by a sub matrix consisting of a 3×3 array of points (e.g. arranged in rows or columns, defining a square), with each point in the sub matrix denoting a unique digit, e.g. between 1 and 9, and the absence of a marker in the sub matrix denoting another digit, e.g. the number 0. Of course, the sub matrix may be of any pre-defined shape and include up to ten or more points.

According to another aspect of the invention, there is provided a coded information system including a database containing information about each of a plurality of different food products, and a unique code associated with each food product in the database, wherein said codes are applied to the food products or their packaging in an optical machine readable format which is repeated over at least a portion of the respective food product or its label or packaging, the system further including a device configured for optical machine reading the code on the food products and for using the code to access the database and extract information relating the food product, the information including at least one of the following: price, country of origin, best before date, nutritional information, allergy information, weight, special offers, number of servings, preparation information, ready to eat, calorific value.

The invention is equally applicable to other retail items such as clothing, white goods and medicines, wherein the code allows the user to access information about the retail item.

In exemplary embodiments, the unique codes are presented in a manner discreet enough to be part of the printed design of a label or packaging for a product, without changing the overall appearance of the printed design. The codes may be applied as part of the reprographic process and incorporated into the printed design. The code may be applied in such a way that it takes up no extra or added space on the label area, e.g. as can be achieved using Braille. This is wholly contrary to conventional barcodes, which take up a dedicated area of the label or packaging. Hence, such embodiments can be used to replace conventional barcodes, leaving more space for product information or advertising on the label or packaging.

In exemplary embodiments, the area of the code zone will be less than 10 mm$^2$ and/or greater than 1 mm$^2$.

The code zone may have any suitable shape, e.g. of triangular, square, rectangular, cruciform or circular area.

The code zone may be repeated over a portion of the product or packaging, e.g. in a repeat pattern of identical code zones, e.g. one adjacent another, over a specific portion of the product or packaging (which may correspond to an area of printed information on the product or its packaging). Such configurations would be ideally suited for reading using a pen-type optical reading device.

The unique codes may be applied to the products or their packaging in an optical machine-readable code format in accordance with the above aspect of the invention.

According to a still further aspect of the invention, there is provided a retail system including a database containing a plurality of barcode numbers, each barcode number in the database relating to information about a particular retail item, the system further including a plurality of retail items, wherein each retail item is marked with an alternative optical machine-readable code which corresponds to one of the barcode numbers in said database, wherein the alternative code is provided in a repeat pattern for scanning for scanning with a optical device, and wherein the alternative code has a format including an optical machine-readable code zone and a plurality of optical machine-readable code markers arranged within the code zone, wherein each of the optical machine-readable code markers is arranged at one of a plurality of pre-defined positions within the code zone, the format further including an optical machine-readable orientation device indicating the correct orientation of the code zone, and wherein the position of the code markers within the correctly orientated code zone defines the alternative code which corresponds to said barcode.

This system is of particular use for blind or partially sighted users, wherein the repeat pattern improves the chance of a blind or partially sighted user positioning the device adjacent the code format, and the orientation marker ensures that the code format is read in the correct way, irrespective of the orientation of the product during scanning.

The alternative code may be provided directly on the retail item or on a label or other packaging for the retail item.

In exemplary embodiments, the alternative codes are presented in a manner discreet enough to be part of the printed design of a label or packaging for a product, without changing the overall appearance of the printed design. The alternative codes may be applied as part of the reprographic process and incorporated into the printed design. In exemplary embodiments, the code takes up no extra or added space on the label area, e.g. as can be achieved using Braille. This is wholly contrary to conventional barcodes, which take up a dedicated area of the label or packaging. Hence, such embodiments can be used to replace conventional barcodes, leaving more space for product information or advertising on the label or packaging.

In exemplary embodiments, the area of the code zone will be less than 10 mm$^2$ and/or greater than 1 mm$^2$.

The code zone may have any suitable shape, e.g. of triangular, square, rectangular, cruciform or circular area.

The code zone may be repeated over a portion of the product or packaging, e.g. in a repeat pattern of identical code zones, e.g. one adjacent another, over a specific portion of the product or packaging (which may correspond to an area of printed information on the product or its packaging). Such configurations would be ideally suited for reading using a pen-type optical reading device.

The unique codes may be applied to the products or their packaging in an optical machine-readable code format in accordance with the above aspects of the invention.

According to another aspect of the invention, there is provided a machine-readable code format which uses machine-readable code markers arranged at one of a plurality of pre-defined positions relative to one another for conveying a pre-defined code, wherein the code format uses a machine-readable orientation device for indicating a correct orientation of the code markers, for ensuring that the code markers are read in the correct sequence.

In exemplary embodiments, the code format is configured for reading using an optical device.

The pre-defined code may correspond to an existing barcode number, for applying to retail items (e.g. directly onto a retail item, or on a label or part of the packaging for a retail item).

In exemplary embodiments, the code format is arranged in a repeat pattern.

In exemplary embodiments, the code format is presented in a manner discreet enough to be part of the printed design of a label or packaging for a product, without changing the overall appearance of the printed design.

The code format may be applied as part of the reprographic process and incorporated into the printed design. In such embodiments, the code can be applied in a manner to take up no extra or added space on the label area, e.g. as can be achieved using Braille.

The code markers may be arranged in a code zone of any suitable shape, e.g. of triangular, square, rectangular, cruciform or circular area.

The code zone may be repeated over a portion of the product or packaging, e.g. in a repeat pattern of identical code zones, e.g. one adjacent another, over a specific portion of the product or packaging (which may correspond to an area of printed information on the product or its packaging). Such configurations would be ideally suited for reading using a pen-type optical reading device.

In exemplary embodiments, the area of the code zone will be less than 10 mm$^2$.

In exemplary embodiments, the area of the code zone will be greater than 1 mm$^2$.

The pre-defined code preferably contains a number of integers represented by a sequence of code markers within the code zone. The code format may include an identifier (e.g. one or more specific markers) for indicating the number of integers contained in the pre-defined code, or for indicating the nature of the pre-defined code (e.g. to distinguish between different lengths of bar code, or to distinguish between a barcode and a date code).

The code format may include a code zone configured for receiving a maximum number of code markers, and the identifier may be used to indicate the actual number of code markers that are required to constitute the pre-defined code. The actual number may be equal to or less than the maximum number of code markers. One or more code markers may therefore be redundant in certain applications.

The orientation device may be separate from the code zone.

In exemplary embodiments, the code format includes a matrix of points, e.g. in a pre-defined array, with individual points in the matrix representing individual parts of the code, e.g. with each point representing an individual integer of the code. Hence, the code markers may be positioned at a plurality of said points in the matrix, in order to define a machine readable sequence of code integers.

In these embodiments, a code marker may be positioned at one of a plurality of pre-defined locations associated with one of said points in the matrix, e.g. wherein each pre-defined location represents a specific code integer associated with the respective point in the matrix.

The orientation device may comprise a pattern of marked points on the matrix.

In exemplary embodiments, the code zone forms part of a matrix of points, e.g. in a pre-defined array, wherein a plurality of points in the matrix defines the code zone and other points in the matrix define the orientation device.

The code format may take the form of an array of dots or other markers (such as crosses or other symbols/shapes) provided in a pattern on a matrix consisting of a plurality of pre-defined points, wherein the pre-defined points in the matrix represent parts or integers of the code, so that the pattern of markers on the matrix defines an optical machine-readable sequence of code parts or integers.

The pattern of markers on the matrix may include a plurality of fixed markers and a plurality of variable markers, wherein said fixed markers define the orientation device (so that a scanner or imaging device configured for reading the format can determine the correct orientation of the matrix), and wherein the variable markers define the code.

In exemplary embodiments, the variable markers are positionable at one of a plurality of pre-defined locations associated with a respective one of said pre-defined points in the matrix, each pre-defined location representing a code integer for the respective point in the matrix. Each plurality of pre-defined locations may represent a sub matrix of points within said matrix.

In one example, each point in the matrix is defined by a sub matrix consisting of a 3×3 array of points (e.g. arranged in rows or columns, defining a square), with each point in the sub matrix denoting a unique digit, e.g. between 1 and 9, and the absence of a marker in the sub matrix denoting another digit, e.g. the number 0. Of course, the sub matrix may be of any pre-defined shape and include up to ten or more points.

Other advantages, aspects and features of the invention will be apparent from the claims and following description, made by way of example only, with reference to the accompanying drawings, in which:

FIG. 1 is a schematic perspective view of a pre-packed food product;

FIG. 7 is an example of a code matrix for use in exemplary embodiments of the invention;

FIG. 8 is a further example of a sub-matrix for use in exemplary embodiments of the invention;

Figure 3:
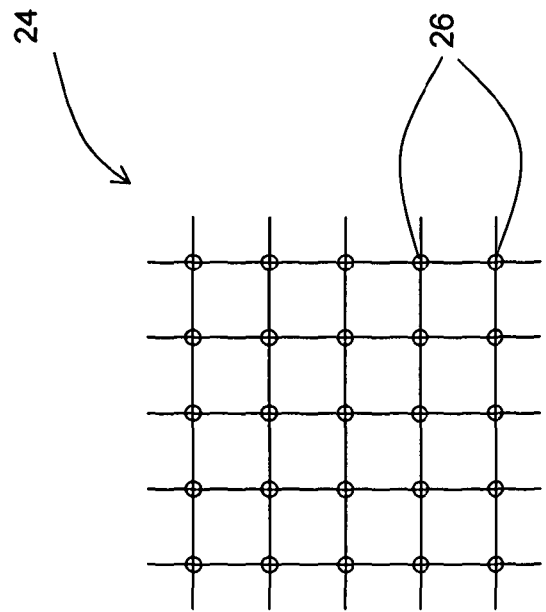
FIG. 3 is an example of a code matrix for use in exemplary embodiments of the invention.

FIG. 1 shows a retail item 10 in the form of a pre-packed food product 12 stored for retail purposes in packaging 14. The packaging 14 has a label 16 which includes information about the product 12 (e.g. price, nutritional information, best before date, country of origin etc). The retail item 10 also include a conventional barcode 18 as part of the label 16, which can be read using a conventional barcode scanner or similar optical device.

In accordance with an exemplary embodiment of the invention, the retail item 10 is further provided with alternative coded information (not visible in FIG. 1) relating to the retail product.

The alternative coded information is presented in a manner discreet enough to be part of the printed design of the label 16, without changing the overall appearance of the printed design. In this embodiment, the coded information is provided on the normal printed area of the label 16, e.g. applied over or beneath other printed information about the product or its packaging during the reprographic process. Advantageously, this means that the coded information takes up no extra or added space on the label area, e.g. as can be achieved using Braille. This is contrary to conventional barcode techniques, which require a dedicated part of the printed design.

In this embodiment, the coded information is applied without being overtly visible to the naked eye (unlike the conventional barcode 18), e.g. using a specific colour or by being reversed from the background colour in the region that the coded information is applied, so as to be readable against or through the printed information on the label 16. The coded information may be applied by a printing technique.

Alternatively or in addition (where appropriate), the coded information may be applied directly to the product and/or to a part of the packaging 14 other than the label 16, e.g. without being overtly visible (as described above).

In exemplary embodiments, the conventional barcode 18 is omitted, leaving more space for product information or advertising on the label.

Although not illustrated, the coded information on the label 16 of FIG. 1 is repeated, e.g. in a continuous pattern over a specific portion of the label 16. This enables an associated scanner or imaging device to readily detect/read the information. This is particularly useful for blind or partially sighted users, and is contrary to conventional barcode techniques (where, typically, a single barcode is provided in isolation on a specific portion of the product or its label/packaging).

Typically, the coded information will correspond to an established barcode number for the product. Conveniently, this enables the scanner or imaging device to identify the product using the retailer's barcode database. In exemplary embodiments, this also enables a user to access other information held by the retailer in association with the bar code, e.g. information held on the label of the product or packaging. Printed label information is a legal requirement in many countries, yet is not readily accessible to the blind or partially sighted. However, embodiments of the kind described above enable the blind or partially sighted to access barcode-related information.

In the embodiment of FIG. 1, the area defined by each instance of the code on the label 16 is less than 10 mm², but greater than 1 mm².

Figure 2:
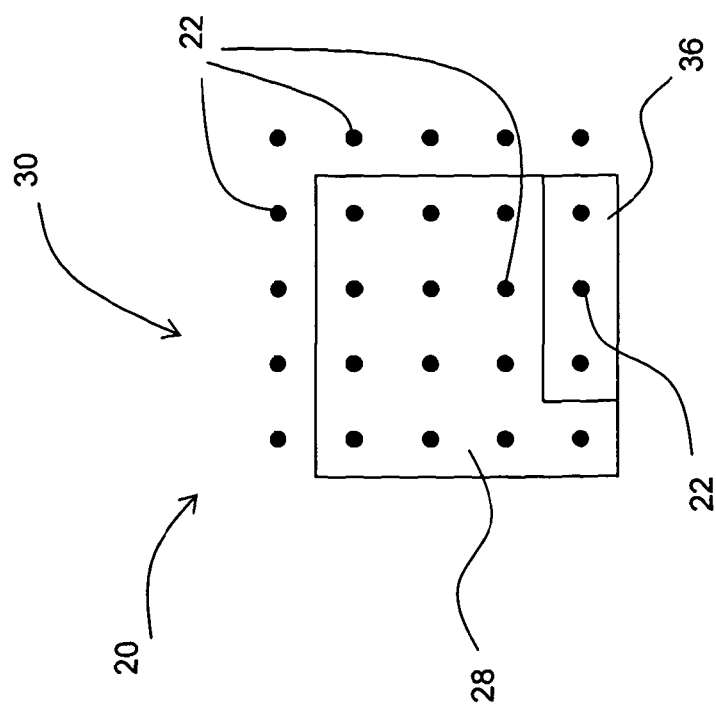
FIG. 2 is an example of a code format for use in exemplary embodiments of the invention.

FIG. 2 shows an exemplary embodiment of a code format, indicated generally at 20, for displaying the alternative coded information referred to above in an optical machine-readable manner. The code format 20 consists of an array of dot-type code markers 22 arranged in a pre-defined pattern, corresponding to a pre-defined code.

The array of dots 22 is provided on a code matrix 24, an example of which is shown in FIG. 3. The code matrix 24 consists of a plurality of pre-defined points 26. In this example, the points 26 are arranged in rows and columns to define a 5×5 matrix of points 26. In the embodiment of FIGS. 2 and 3, the matrix 24 defines a square area. In other embodiments, the matrix 24 may have another shape, e.g. defining a triangular, rectangular, cruciform or circular area.

The matrix 24 includes a code zone 28. In use, the dots or other code markers provided in association with the points 26 within the code zone 28 represent specific parts or integers of the pre-defined code that is represented on the matrix 24. Hence, the specific pattern of dots 22 within the code zone 28 of FIG. 2 provides an optical machine-readable sequence of code parts or integers.

As will be described in more detail below, the precise position of the dots 22 within the code zone 28 (i.e. relative to the pre-defined points 26 on the matrix 24) can be selected from a plurality of different pre-defined combinations, corresponding to a plurality of different codes that may be represented by the format 20. Hence, the dots 22 within the code zone 28 can be referred to as 'variable' dots.

The code format 20 also includes an optical machine-readable marker or orientation device (indicated generally at 30), for indicating the correct orientation of the code zone 28, such that the specific pattern of dots 22 within the correctly orientated code zone 28 corresponds to a pre-defined code. e.g. consisting of a plurality of code integers arranged in a desired sequence.

In this embodiment, the orientation device consists of a plurality of dots 22 in a pre-defined pattern outside the code zone 28. The position of these dots 22 relative to the code zone 28 is pre-selected, and so these dots can be referred to as 'fixed' dots. The purpose of the orientation device is to enable a scanner or imaging device configured for reading the format 20 to identify the position of the fixed dots and thereby determine the correct orientation of the code zone 28.

As mentioned above, the precise position of the dots 22 within the code zone 28 can be varied. In exemplary embodiments, the variable dots 22 may be positioned at one of a plurality of pre-defined locations associated with a respective one of said pre-defined points 26 in the code zone 28. Each pre-defined location may represent a symbol or digit for use as a specific integer of the code associated with the respective point 26 in the matrix 24, e.g. in order to provide a plurality of potentially different readings for that point 26 in the code zone 28.

Put another way, the exact location of each variable dot can be varied relative to an associated point 26 in the matrix 24. Each point 26 may define a notionally fixed position for one of said dots 22, but the exact position of the dot may be varied relative to its notionally fixed position, in order to provide a plurality of potentially different readings for that point 26 in the code zone 28.

In exemplary embodiments, the plurality of pre-defined locations associated with each point 26 in the code zone 28 may be provided as a sub-matrix within the code zone 28. An example of such a sub-matrix is indicated at 32 in FIG. 4. The sub-matrix 32 has a notional fixed position 34, intended to correspond to the exact location of one of the points 26 in the code zone 28. In use, a dot 22 may be positioned at the notionally fixed position 34 or can be positioned at one of the other locations in the sub-matrix 32 (i.e. relative to the notionally fixed position 34), wherein the pre-defined locations can be assigned a symbol or digit for use as an integer of the code that is being represented by the format 20.

In this embodiment, the notionally fixed position 34 is arranged at the centre of a 3×3 array of pre-defined locations for a dot 22, wherein each of the pre-defined locations is assigned a unique number from 1 to 9, and wherein the absence of a dot within the sub-matrix 32 is taken to indicate another number or symbol, e.g. zero. In the illustrated embodiment, the variable locations are arranged as a sub-matrix of rows and columns, wherein the notional fixed position is at the centre of the sub-matrix and denotes the number '5'. Of course, the sub-matrix 32 may be of any pre-defined shape and include up to ten or more pre-defined marker locations.

The number of integers in the code that is stored by the format 20 may need to be different for different applications. For example, the code format may be used to represent an 8-digit barcode or a 13 digit bar code, a date code format (such as 01/18 1974 to represent 18 Jan. 1974), or a multi digit batch code for products. Hence, exemplary embodiments of the invention include an identifier (e.g. defined by one or more markers in the array), to indicate that the array holds a code having a pre-determined number of code integers. Hence, for certain lengths of code sequence, not all of the points in the code zone will be required.

The number of integers in the code that is stored by the format 20 may need to be different for different applications. For example, the code format may be used to represent an 8-digit barcode or a 13-digit barcode. In other embodiments, the code format may be used to represent a date code format (e.g. 01/18/1974 to represent 18 Jan. 1974), or a multi digit batch code for products. Hence, exemplary embodiments of the invention include an identifier (e.g. defined by one or more markers in the array), to indicate that the array holds a code having a pre-determined number of code integers (e.g. the length of the code sequence). Hence, for certain lengths of code sequence, not all of the points in the code zone will be required.

A method of operation of the code format 20 will now be described, by way of example, wherein a user is provided with an optical device configured for machine-reading or scanning the pattern of dots in the array 20, e.g. using a program or software programmed to analyse the pattern.

The optical device is pointed at or scans over the code format. The pre-defined pattern of fixed markers in the array is identified, in order to establish the correct orientation of the pattern. The number of integers in the code is determined (e.g. by recognising the identifier 36). The pattern is analysed to extract data from the variable markers in the array, e.g. by establishing the sequence and exact position of the variable markers in the code zone 28.

For the embodiment illustrated in FIG. 2, the dots in the top row and the right hand column are fixed in a generally L-shaped arrangement. This pattern is used as the orientation device, and can be used to determine the correct orientation and perimeter of the matrix, as well as the start point for the code zone. The middle three dots on the bottom row of the array are used as the identifier 36. In this embodiment, the presence of all three dots indicates that the code in the array has 13 digits, whereas the presence of only a single dot indicates that the code has 8 digits. Of course, other predefined combinations can be used to denote different code lengths. The remaining dots define the code zone 28. Each of said dots is located at the notional centre position of a 3×3 sub-matrix of variable positions (e.g. of the kind shown in FIG. 4) for each point in the code zone 28. Hence, the 13 digit code held by the array 20 is 5555555555.

Figure 5:
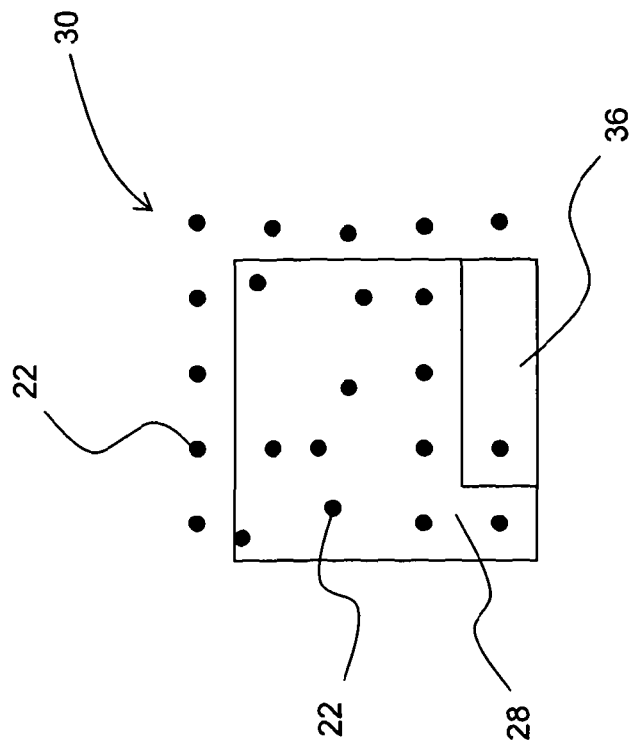
FIG. 5 is a further example of a dot code configuration in accordance with an embodiment of the invention.
Figure 4:
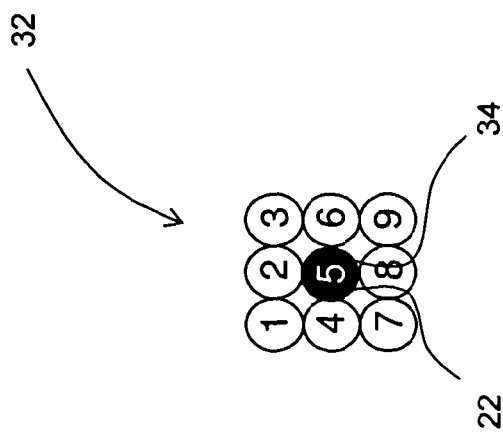
FIG. 4 is an example of a sub-matrix for use in exemplary embodiments of the invention.

FIG. 5 shows a further 5×5 matrix with the same fixed dots as FIG. 4, but with only a single identifier dot, and the variable dots in different locations (or absent altogether) in 3×3 sub-matrices of variable positions for each respective point 26 in the code zone 28. The resultant 8 digit code is 28056247.

Figure 6:
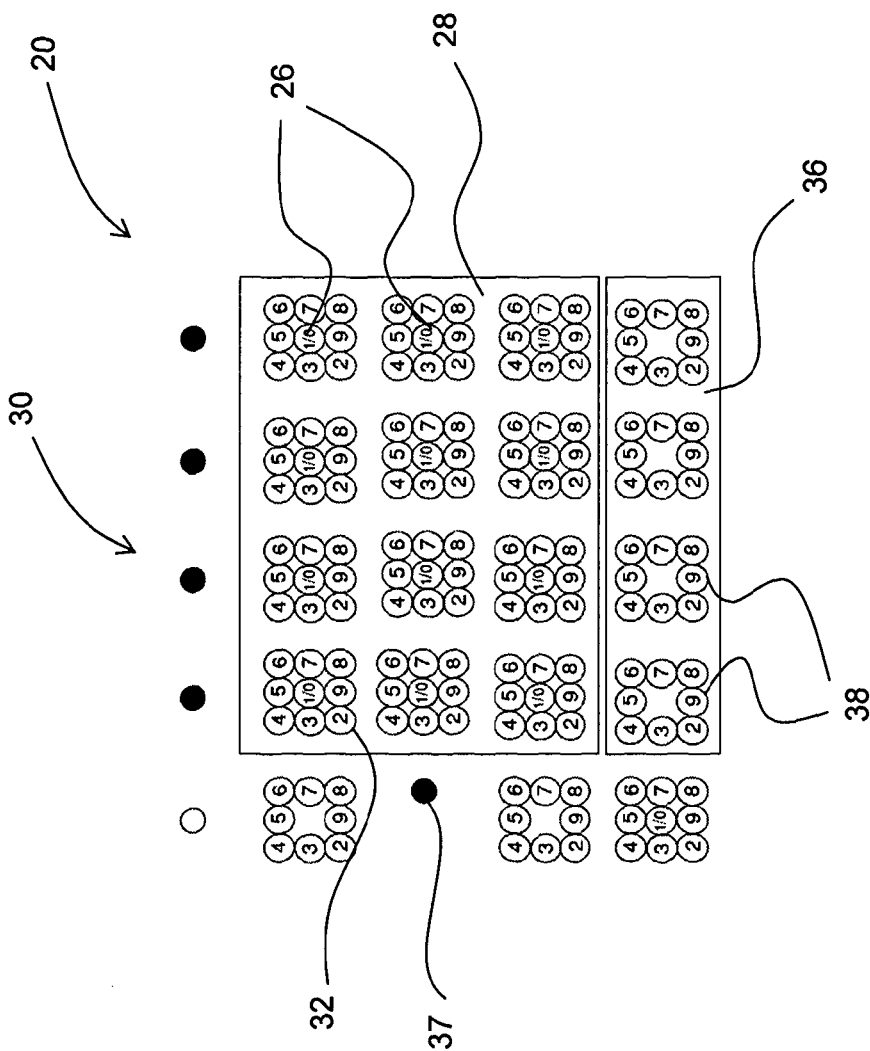
FIG. 6 is an example of a dot code configuration in accordance with a further embodiment of the invention.

FIG. 6 shows a further embodiment, in the form of a 5×5 code matrix. For the purpose of this discussion, reference is also made to FIG. 7, which provides exemplary nomenclature for the various points in the matrix of FIG. 6. In particular, the matrix of FIG. 6 defines multiple rows and columns referred to as hn and vn respectively (where h means horizontal, v means vertical and n denotes the number of the row or column). Hence, the point in the matrix found at the top of the third column in FIG. 6 can be referred to as point h1,v3, according to FIG. 7.

Whereas the embodiments of FIGS. 2 to 5 may include a blank space (i.e. no dot or other marker) at one or more of the points 26 in the matrix 24, embodiments of the kind depicted or described with reference to FIG. 6 have a marker associated with each and every point 26 in the matrix 24. Hence, the absence of a marker at one of the points 26 in the matrix 24 will be indicative of a damaged or incorrectly configured matrix.

As with the previous embodiments, the embodiment of FIG. 6 includes orientation markers which serve as a fixed orientation or reference device 30, for correctly orientating the code. For example, the reference device 30 in FIG. 6 consists of a single row of code markers arranged in a straight line and at a uniform spacing from one another. In this embodiment, the reference markers are dots presented at the notional fixed position along the outermost row (e.g. the top row h1 as viewed in FIG. 6) of the code matrix. In exemplary embodiments, the code matrix is configured such that no other row or column of dots can be provided in a straight line at uniform spacing.

The optical device or program configured for reading the code matrix is configured to identify the presence of the fixed reference markers, in order to identify the correct orientation of the code matrix.

The code matrix of FIG. 6 further includes a unique marker 37, which is provided in association with one of the other points 26 in the matrix. The unique marker 37 is positioned out of sequence with respect to all of the other markers in the code matrix. This prevents a line of equally spaced markers being provided in the row or column in which the unique marker is located, and so avoids conflict with orientation device 30.

In this embodiment, the unique marker 37 is provided in association with point h3v1, as viewed in FIG. 6. The unique marker 37 is located at a unique location relative to the notional fixed position of the respective point 26 in the matrix. For example, where the notional fixed position for each point 26 in the matrix is at the centre of a sub-matrix 32 of pre-defined points (e.g. as shown in FIG. 4), the unique marker 37 is located at a position which does not correspond to one of the predefined positions within the sub-matrices 32. Hence, the location of this marker 37 in the matrix is unique, with no other marker in the code matrix being located outside of the predefined sub-matrix positions.

An optical device or program for reading the code is configured to identify the orientation device and the unique marker, from which it is possible to determine the physical size of the overall matrix. The size and scale of the code matrix can be determined by the spacing of markers on the reference line (h1). The reading device may be set to read only a specific size and scale at a specific focal length so the size of the code area may be predetermined by the device.

As with the previous embodiments, the code matrix of FIG. 6 includes an identifier, for indicating the number of characters in the code stored by the code matrix. In this embodiment, the identifier 36 is in the form of a single marker located at point h1v2 in the illustrated embodiment. Using a sub-matrix of the kind shown in FIG. 8, the location of the marker at one of the predefined positions in the sub-matrix refers to a number, as follows:

Position 2—number 8
Position 3—number 9
Position 4—number 10
Position 5—number 11
Position 6—number 12
Position 7—number 13
Position 8—number 1+13
Position 9—number 2+13

In this embodiment, there is no central marker within the sub-matrix of FIG. 8. This prevents a line of equally spaced markers being provided in the row or column in which the identifier marker 36 is located.

The reference to 1+13 and 2+13 may be used to ensure that the code matrix cannot produce a row of points in a straight line through the code zone of the matrix. For example, if the series of characters in the bar code would normally produce a row of points in a straight line through the code zone of the matrix if the code began at the first point in the code zone, the use of 1+13 or 2+13 or the like would indicate to the machine or program that the code includes 13 characters and that the first number in the code is found at the second or third point in the code zone (rather than at the first point in the code zone). Hence, the machine or program would seek to read the same number of characters, but would know to begin the sequence of the code at a different position in the code matrix.

As with the previous embodiments, the code zone 28 consists of a matrix of points 26 forming part of the overall code matrix 24. In the illustrated embodiment, the code zone is a 4×3 matrix beginning at h2v2.

A marker is provided at each point in the code zone 28 (i.e. at one of the pre-defined locations within a sub-matrix 32 at each point 26 in the code zone 28), and the code is read is sequence, e.g. from top left to right, then centre left to right, then bottom left to right as viewed in FIG. 6. The start point of the sequence can be advanced (e.g. to avoid the creation of a uniform straight line of markers through the code zone 28), as described above.

Figure 9:
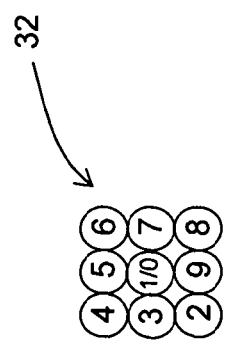
FIG. 9 is a still further example of a sub-matrix for use in exemplary embodiments of the invention.

As with the embodiments of FIGS. 2 to 5, each point 26 in the code zone 28 defines a notional fixed location and multiple variable locations for a marker, wherein the respective notional and variable locations define an individual sub-matrix at each point 26 in the code zone 28. An example is shown in FIG. 9.

It may be necessary for one of the locations in the sub-matrix to denote one of a plurality of possible readings, e.g. when a 3×3 sub-matrix 32 is intended to denote the digits 0 (zero) to 9. This is the case in FIG. 9, in which the middle location represents one of a plurality of possible readings, e.g. 1 or 0 (zero). In embodiments of this kind, a mechanism is required for determining which of the multiple outcomes the particular code marker represents. In exemplary embodiments, other matrix points 26 are used to determine the correct reading, and so further reference will be made to 'determination' points 26 or 'determination' markers (indicated generally at 38).

In the illustrated embodiment, the code zone 28 consists of a plurality of matrix points 26 arranged in columns, and the matrix point 26 located beneath each column of the code zone 28 is used as the determination point. For example, a determination marker provided in association with determination point h5v2 is used for determining the correct reading for the integers of the code represented in rows h2, h3 and h4 of v2, etc.

Figure 10:
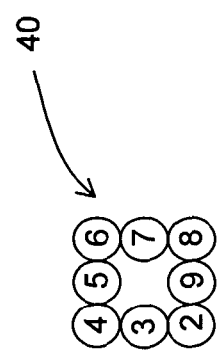
FIG. 10 is a yet further example of a sub-matrix for use in exemplary embodiments of the invention.

In this embodiment, each determination marker 38 can be located at one of a number of positions in a sub-matrix at the respective point 26 in the matrix 24, in order to indicate the correct reading of an associated 'multiple outcome' marker in the code zone 28. For example, using a 3×3 sub-matrix 40 of the kind shown in FIG. 10, the location of the determination marker 38 at one of the predefined positions in the sub-matrix 40 refers to a number sequence, as follows:

Position 2—sequence 000
Position 3—sequence 001
Position 4—sequence 011
Position 5—sequence 111
Position 6—sequence 110
Position 7—sequence 100
Position 8—sequence 101
Position 9—sequence 010

The number sequence determines the correct reading for the 'multiple outcome' location of the column in question (e.g. starting from top to bottom). Hence, if the determination marker 38 at h5v2 is located at position 8 in the sub-matrix 40, the correct reading for any 'multiple outcome' location at point h2v2 is 1, for h3v2 the correct reading is 0 (zero), and for h4v2 the correct reading is 1.

If a marker in the code zone 28 is not placed at one the 'multiple outcome' locations within its own sub-matrix 32, the determination marker 38 is redundant and so can be positioned at any one of the points in its sub-matrix 40. However, it can be seen that the location and format of the sub-matrix 40 of FIG. 10 does not permit a marker to be located at the centre of the sub-matrix. This makes it impossible to achieve a vertical line of five markers at uniform spacing (extending through the code zone 28), to avoid conflict with the reference device 30 described above.

The code matrix further includes a check marker 42 for providing a check digit at the start or end of the code. The check marker 42 operates in the same way as the markers in the code zone 28, and so has an associated sub-matrix 32. Furthermore, a determination marker 44 is provided specifically for the check marker 42. The determination marker 44 operates in the same way as the other determination markers 38, i.e. for indicating the correct reading for the 'multiple outcome' location within the sub-matrix 32 associated with the check marker 42.

In this embodiment, the check marker 42 is provided at point h5v1 and its determination marker 44 is provided at point h4v1. Arranging the check marker 42 and its determination marker 44 in this way (i.e. by not aligning all of the determination markers 38, 44 in the same row) avoids the possibility of the bottom row of the matrix producing a straight line of five markers at uniform spacing, to avoid conflict with the reference device 30 described above.

A method of operation of the code format of the kind shown in FIG. 6 is generally the same as the method described with respect to the embodiments of FIGS. 2 to 5. In particular, the user is provided with an optical device configured for machine-reading or scanning the pattern of dots in the code matrix. The reference device is identified, to establish the correct orientation of the pattern. The size and scale of the code may also be determined. The unique marker 37 is identified, as is the number of integers in the code (e.g. by reading the identifier 36). The pattern of markers is analysed to extract the correct code from the variable markers in the array, e.g. by establishing the sequence and exact position of the variable markers in the code zone 28 and at the check point 42, with reference to the determination markers 38, 44 where appropriate.

In exemplary embodiments, optical machine-readable code formats of the kind described above (e.g. in relation to any of the illustrated embodiments) are used to present a unique code, for example corresponding to an existing bar code for a product. The machine-read code can then be used to interrogate a database or list of products, e.g. in order to identify, select or download information relating to the product which is represented by the machine-read code.

In one example, a consumer is provided with an optical device configured for reading the code format as applied to items for sale in a retail outlet. The device may be the consumer's own device (e.g. a pre-purchased item) or a device provided by the retail outlet for in-store use. The device may be programmed with or arranged in communication (e.g. via wireless link) with information relating to all of the products available for purchase in the retail outlet (e.g. by accessing the retail outlet's own database).

The device may be programmable, so that the user can pre-select information of interest or importance to them (e.g. price, use by date, country of origin), and/or pre-select the order in which they wish the information to be relayed or recorded when shopping. The device may include a readable memory and/or a readable screen and/or an audio outlet for communicating the information read by the device. Translation software may be provided, for use by non-native speaking users.

In exemplary embodiments, the device may also be programmed for automatically ordering a repeat purchase (e.g. for doorstep delivery). The repeat purchase may be activated if the code is re-scanned, e.g. after use of the product in question. This may be of particular use where the code format is applied to prescription medicines and associated medical equipment.

The code format can also be used for other packaging applications such as pharmaceutical products, where the code represented by the code format can be used to access information about the product from a database. This is of particular importance for Blind or partially-sighted users who need access to the information. Information, such as how to take or administer the drug (and/or side effects, precautions, and/or contact advice) is required by law in many countries. Typically, this kind of information is provided on the leaflet within the packaging. In addition, the information may be held in a database and accessed remotely, via the code (e.g. applied to the packaging and/or the leaflet).

The code format may be used to represent different lengths of barcode (e.g. using 8 code markers to represent an 8-digit barcode sequence. The code format may be used to represent types of date code format (e.g. 01/18/1974 to represent 18 Jan. 1974). The code format may be used to represent other information, e.g. a multi digit batch code represented by a corresponding number of code markers. In each case, code format may include an identifier (e.g. as described above) which denotes the length or type of code sequence represented by the code markers.

Although the embodiments illustrated herein use dots 22 to display the code, other code markers may be used, such as crosses or other machine readable symbols or motifs. In exemplary embodiments, the area defined by the array of dots/code markers is less than 10 mm². Hence, use of the code may help to reduce the size and surface area of printed packaging, reducing associated costs and the environmental impact. The code can be printed onto small packs or labels without the need for secondary packaging to carry the text information.

An electronic system or software may be provided, whereby a user is able to record the type and quantity of product at the user's home (e.g. by scanning the individual products/packing provided with a code format of the kind described herein with an optical device configured for reading the code format), for electronic storage of the relevant information in a specific database. The system or software may be configured for electronically updating said database, e.g. by e-scanning the product/packaging after use or prior to disposal of the product/packaging. The system or software may be configured for electronically re-ordering a quantity of one or more of the products, e.g. after use or prior to disposal of the product/packaging. This will be of particular relevance to food products and food shopping applications. However, this system may also be applied to other types of product, e.g. medical products or domestic products of the kind commonly available in a retail environment.

The code format may also be applied to literature and the like, for identifying products referred to in the literature.

In one example, the code format is applied to cookery literature, e.g. in the region of an ingredients list for a recipe, so that a user can electronically identify the individual ingredients in the list using an optical scanner or other optical imaging device programmed to read the applied code formats of the kind described herein. An electronic system or software may be provided for automatically checking whether the user has the necessary ingredients and/or for remotely ordering one or more of the necessary ingredients (e.g. those which the user doesn't currently have), dependent on the specific code(s) read by the scanner.

In another example, a code format of the kind described herein is applied to promotional literature or product catalogues, e.g. in the region of an image or text information about a product or service, so that a user can electronically identify a product or service using a scanner or other imaging device programmed to read the applied codes. An electronic system or software may be provided for automatically ordering the identified product or service.

In another example, a code format of the kind described herein is applied to a publication such as a book, newspaper, magazine or advertisement, wherein said publication includes readable text, and wherein one or more portions of said readable text is represented by a code applied adjacent said portion(s) of text. For example, the readable text may be displayed as a plurality of lines of text, and the code may be applied between two adjacent lines of text. The code may be arranged to overlie or underlie said portion(s) of text, or to otherwise overlap said portion(s) of text.

In another example, a document (such as a household bill, a bank statement or a page printed by a computer printer) includes a section of information presented in text or image format. The information is further presented on the document as a code in an optical machine readable code format of the kind described herein. The code may overlie or underlie said information, or otherwise overlap said information. The code may be applied adjacent said information. If the information is presented as lines of text, the code may be applied between adjacent lines of the text.

In another example, an image is shown on an electronic display screen (e.g. a computer or telephone interface). Information related to the image is represented on the screen by a unique code using pixels arranged to represent the code on the screen in an optical machine readable code format of the kind described herein.

The invention claimed is:

1. An optical machine-readable code format comprising:
an optical machine-readable code zone; and
a plurality of optical machine-readable code markers arranged within the code zone,
wherein each of the optical machine-readable code markers is arranged at one of a plurality of pre-defined positions within the code zone, the code format further including an optical machine-readable orientation device indicating a correct orientation of the code zone, wherein the position of the code markers within a correctly orientated code zone corresponds to a pre-defined code, wherein the code zone is a matrix of points in a pre-defined array, the points in the matrix represent code integers, and the code markers are positioned at a plurality of said points in the matrix to define an optical machine readable sequence of code integers, wherein the code markers are positionable at one of a plurality of pre-defined locations associated with a respective point in the matrix, wherein each pre-defined location represents a specific code integer associated with the respective point in the matrix wherein the plurality of pre-defined locations defines a sub-matrix within the matrix, and wherein one of the plurality of locations in the respective sub-matrix denotes one of a plurality of pre-defined readings for therespective code marker, and wherein the code format includes a determination marker that indicates which of the plurality of pre-defined readings applies.

2. The optical machine-readable code format of claim 1, wherein the pre-defined code contains a number of integers represented by a sequence of code markers within the code zone.

3. The optical machine-readable code format of claim 1, wherein the code format further includes an identifier for indicating the number of integers contained in the pre-defined code.

4. The optical machine-readable code format of claim 1, further comprising: an array of markers provided in a pattern on a matrix consisting of a plurality of pre-defined points, the pre-defined points in the matrix representing code integers, so that the pattern of markers on the matrix defines an optical machine readable sequence of code integers.

5. The optical machine-readable code format according to claim 4, wherein the variable markers are positionable at one of a plurality of pre-defined locations associated with a respective one of said pre-defined points in the matrix, each pre-defined location representing a specific code integer for said respective point in the matrix.

6. The optical machine-readable code format according to claim 4, wherein the markers in the array of markers is one of at least dots or crosses.

7. The optical machine-readable code format according to claim 6, wherein the distinct digit denoted by each point in the sub-matrix is between 1 and 9, inclusive, and wherein the further distinct digit denoted by the absence of the marker in the sub-matrix is 0.

8. The optical machine-readable code format of claim 1, wherein the orientation device is defined by a unique pattern of markers on the matrix.

9. The optical machine-readable code format of claim 1, wherein the pattern of markers on the matrix includes a plurality of fixed markers and a plurality of variable markers, said fixed markers acting as the orientation device, and all or a plurality of said variable markers representing the pre-defined code.

10. The optical machine-readable code format according to claim 1, wherein the area of the code format is less than 10 mm$^2$.

11. The optical machine-readable code format according to claim 1, wherein the code format defines an area and is arranged in a repeat pattern, one area adjacent another, for scanning with a device configured to read the code format.

12. The optical machine-readable code format according to claim 1, wherein the sub-matrix consists of an array of nine points, each point in the sub-matrix denoting a distinct digit, and wherein the absence of a marker in the sub-matrix denotes a further distinct digit.

13. A coded information system, comprising:
a plurality of retail items each having an associated code which is presented on the respective retail items in an optical machine-readable code format having an optical machine-readable code zone; and
a plurality of optical machine-readable code markers arranged within the code zone,
wherein each of the optical machine-readable code markers is arranged at one of a plurality of pre-defined positions within the code zone, the code format further including an optical machine-readable orientation device indicating a correct orientation of the code zone, wherein the position of the code markers within a correctly orientated code zone corresponds to a pre-defined code, wherein the code zone is a matrix of points in a pre-defined array, the points in the matrix represent code integers, and the code markers are positioned at a plurality of said points in the matrix, in order to define an optical machine readable sequence of code integers, wherein the code markers are positionable at one of a plurality of pre-defined locations associated with a respective point in the matrix, wherein each pre-defined location represents a specific code integer associated with the respective point in the matrix wherein the plurality of pre-defined locations defines a sub-matrix within the matrix, wherein one of the plurality of locations in the respective sub-matrix denotes one of a plurality of pre-defined readings for the respective code marker, and wherein the code format includes a determination marker that indicates which of the plurality of pre-defined readings applies, and wherein the code corresponds to one of:
an existing barcode number for the retail item,
a date code for the retail item, or
a batch code for the retail item.

14. A coded information system according to claim 13, wherein the code format is arranged in a repeat pattern, for scanning with a device configured to read the code format.

15. A coded information system according to claim 13, wherein the code format is presented in a manner discreet enough to be part of the printed design of a label or packaging for the retail item, without changing the overall appearance of the printed design.

16. A coded information system according to claim 13, wherein the retail items include a printed area containing information about the retail item in one or more of an alphanumeric, pictorial or typographic form, and wherein the code format is applied across at least a portion of said printed area.

17. A coded information system comprising:
a database containing information about each of a plurality of different food products; and
a unique code associated with each food product in the database, wherein said codes are applied to the food products or their packaging in an optical machine-readable code format which is repeated over at least a portion of the respective food product or its packaging; and
a device configured to optical machine read the code on the food products and to use the code to access the database and extract information relating the food product, the information including at least one of the following: price, country of origin, best before date, nutritional information, allergy information, weight, special offers, number of servings, preparation information, ready to eat, and calorific value,
wherein the optical machine-readable code format has an optical machine-readable code zone and a plurality of optical machine-readable code markers arranged within the code zone, wherein each of the optical machine-readable code markers is arranged at one of a plurality of pre-defined positions within the code zone, wherein the code format includes an optical machine-readable orientation device indicating a correct orientation of the code zone, wherein the position of the code markers within a correctly orientated code zone corresponds to a pre-defined code, wherein the code zone is a matrix of points in a pre-defined array, the points in the matrix represent code integers, and the code markers are positioned at a plurality of said points in the matrix, in order to define an optical machine readable sequence of code integers, wherein the code markers are positionable at one of a plurality of pre-defined locations associated with a respective point in the matrix, wherein each pre-defined location represents a specific code integer associated with the respective point in the matrix wherein the plurality of pre-defined locations defines a sub-matrix within the matrix, and wherein one of the plurality of locations in the respective sub-matrix denotes one of a plurality of pre-defined readings for the respective code marker, and wherein the code format includes a determination marker that indicates which of the plurality of pre-defined readings applies.

18. A product identification system comprising:
an electronic database of unique codes, each code corresponding to a particular product;
an optical machine-readable code format displaying a code which represents or corresponds to one of the unique codes; and
an optical imaging device configured for reading said code format to identify said unique code,
wherein the system is configured to enable a user to scan a product with the optical imaging device, identify the optical machine-readable code format applied to the product or its packaging, and electronically retrieve information about the product by interrogation of the database of unique codes using the code displayed by the code format, wherein the system is configured to enable the user to electronically record information about the scanned product, and to electronically update the information about the product by re-scanning the product or its packaging using an optical imaging device configured for reading said code format to identify said unique code, and wherein the optical machine-readable code format has an optical machine-readable code zone and a plurality of optical machine-readable code markers arranged within the code zone, wherein each of the optical machine-readable code markers is arranged at one of a plurality of pre-defined positions within the code zone, wherein the code format further includes an optical machine-readable orientation device indicating a correct orientation of the code zone, wherein the position of the code markers within a correctly orientated code zone corresponds to a pre-defined code, wherein the code zone is a matrix of points in a pre-defined array, the points in the matrix represent code integers, and the code markers are positioned at a plurality of said points in the matrix, in order to define an optical machine readable sequence of code integers, wherein the code markers are positionable at one of a plurality of pre-defined locations associated with a respective point in the matrix, wherein each pre-defined location represents a specific code integer associated with the respective point in the matrix wherein the plurality of pre-defined locations defines a sub-matrix within the matrix, and wherein one of the plurality of locations in the respective sub-matrix denotes one of a plurality of pre-defined readings for the respective code marker, and wherein the code format includes a determination marker that indicates which of the plurality of pre-defined readings applies.

19. A system according to claim 18, wherein the system is configured for electronically re-ordering a quantity of said product after re-scanning of the product.

\* \* \* \* \*